(12) United States Patent  (10) Patent No.: US 7,277,959 B2
Miyamoto et al.  (45) Date of Patent: Oct. 2, 2007

(54) INFORMATION DELIVERY DISPLAY SYSTEM AND INFORMATION DELIVERY DISPLAY METHOD

(75) Inventors: Kazuhiro Miyamoto, Tokyo (JP); Toshiyuki Amaya, Saitama (JP); Makoto Takanashi, Tokyo (JP); Hiroaki Mise, Tokyo (JP)

(73) Assignee: Pioneer Corporation, Tokyo (JP)

( * ) Notice: Subject to any disclaimer, the term of this patent is extended or adjusted under 35 U.S.C. 154(b) by 341 days.

(21) Appl. No.: 11/028,335

(22) Filed: Jan. 4, 2005

(65) Prior Publication Data

US 2005/0151756 A1   Jul. 14, 2005

(30) Foreign Application Priority Data

Jan. 9, 2004   (JP) .............................. 2004-004753

(51) Int. Cl.
*G06F 15/16*   (2006.01)
(52) U.S. Cl. ...................... 709/231; 345/473; 345/619; 709/219
(58) Field of Classification Search ................ 709/231, 709/219; 345/473, 838, 475, 156, 619; 705/16
See application file for complete search history.

(56) References Cited

U.S. PATENT DOCUMENTS

| | | | |
|---|---|---|---|
| 2002/0036640 A1* | 3/2002 | Akiyoshi et al. | 345/475 |
| 2002/0154126 A1* | 10/2002 | Vienneau et al. | 345/473 |
| 2002/0180697 A1* | 12/2002 | Freiberger et al. | 345/156 |
| 2003/0188005 A1* | 10/2003 | Yoneda et al. | 709/231 |
| 2004/0001106 A1* | 1/2004 | Deutscher et al. | 345/838 |
| 2004/0015401 A1* | 1/2004 | Lee et al. | 705/16 |

FOREIGN PATENT DOCUMENTS

JP   2003-101988 A   4/2003

\* cited by examiner

*Primary Examiner*—Jungwon Chang
(74) *Attorney, Agent, or Firm*—Foley & Lardner LLP

(57) ABSTRACT

The file creating processing unit creates at least one material data and at least one control information file to display the material data in a presentation package storage folder corresponding to a presentation pack. When a package creating processing unit receives a delivery designation, the package creating processing unit creates at least one package from all files in the presentation package storage folder to satisfy a predetermined condition and delivers presentation packs in units of packages to an information display device through a data distribution server.

5 Claims, 12 Drawing Sheets

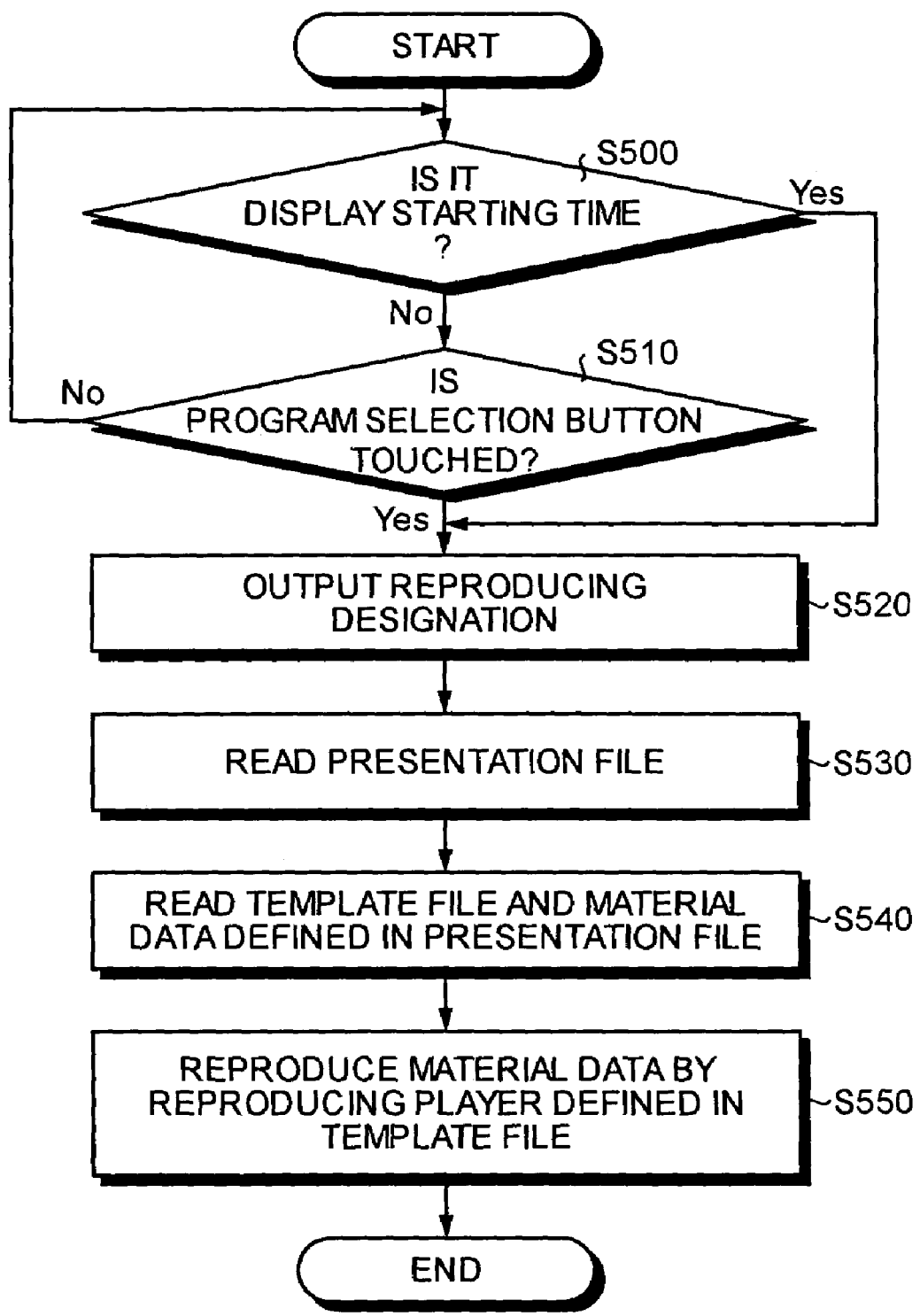

INFORMATION DELIVERY DISPLAY SYSTEM AND INFORMATION DELIVERY DISPLAY METHOD

BACKGROUND OF THE INVENTION

1. Field of the Invention

The present invention relates to an information delivery display system that provides information such as an animated image, a static image, or a character image.

2. Description of the Related Art

Various techniques are conventionally considered that deliver animated image contents (i.e., programs) such as movies by using a network technique. For example, Japanese Unexamined Patent Publication No. 2003-101988 discloses the following conventional technique. In a sale of large-capacity animated image contents, a data transmission device and a receiving/reproducing device are connected to each other through a wide-band broadcast line and a security line having security higher than that of the broadcast line. An order or an accounting process uses the security line, and an ordered program is superposed on broadcast data and delivered.

On the other hand, an information delivery display system having the following configuration is known. Information (i.e., a program) of an in-building guide, a guide of each floor of a department store, or an introduction of a commercial product handled on the floor is created by an information creating device. The created program is delivered to an information display device through a network such as the Internet or a Local Area Network (LAN) to provide the program to an information viewer. In general, the airtime of a program handled by the information delivery display system is considerably shorter than that of a movie or the like. However, one program is not repeatedly displayed. For example, programs are produced for respective commercial products handled on a floor. In many cases, these programs are sequentially displayed as one set. Therefore, in program delivery, a plurality of programs are delivered as a set.

When the conventional technique is applied to the information delivery display system, delivery processes must be performed for respective programs. Therefore, a lot of trouble is caused when there are a large number of programs.

Programs may be delivered in units of sets to reduce the number of times of delivery. However, when a transmission error occurs in delivery, it is not easy to determine the specific program in which the transmission error occurred. Thus, the programs must again be delivered in units of sets. As a result, delivery time becomes disadvantageously long.

SUMMARY OF THE INVENTION

It is an object of the present invention to solve at least the problems in the conventional technology.

An information delivery display system according to an aspect of the present invention includes an information creating device including a package creating processing unit that creates at least one package from at least one material data related to at least one program and at least one control information file in a presentation package; a data distribution server that receives the package created by the package creating processing unit from the information creating device, the data distribution server including a data storage unit that stores the received package, and a presentation package management processing unit that manages packages stored in the data storage unit in units of presentation packs; and an information display device that includes an information receiving unit that receives packages from the data distribution server, a download processing unit that decompresses at least one package received by the information receiving unit to restore the material data and the control information files in the presentation packages, and a display processing unit that reproduces and displays a program based on the material data and the control information files restored by the download processing unit.

An information delivery display method according to an aspect of the present invention includes creating a presentation package having at least one material data related to at least one program and at least one control information file to display the material data; transmitting the created presentation package to an information display device through a network to cause the information display device to reproduce and display the program; creating at least one package with the information creating device from the material data and the control information files in the presentation pack; transmitting the created package to the information display device through the network; and reproducing and displaying the program based on the material data and the control information files in at least one received package.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 13 is a flowchart for explaining an operation performed when the information display device displays a program.

DETAILED DESCRIPTION

Exemplary embodiments of an information delivery display system and an information delivery display method according to the present invention will be described below with reference to the accompanying drawings.

In an information delivery display system that provides information (program) such as a local guide plate, a guide in a building, a guide in each floor of a department store, and an introduction of commercial products handled on the floor to an information viewer, a plurality of programs are frequently sequentially displayed as one set (a set corresponds to one presentation pack). In general, after a creator edits an animated image, a static image, and character information with an information creating device such as a personal computer to create a plurality of programs, a presentation package comprising these programs is delivered to an information display device. In a personal computer or similar device, the creator creates related files in one folder using a folder function or a directory function to make it possible to manage the files in a hierarchical manner.

The present invention relates to hierarchical management of files. In an information creating device, files relating to programs or a sub-folder including such files are created in a folder (i.e., a presentation package storage holder) corresponding to a presentation pack. When the presentation package is designated to be delivered, at least one of a plurality of packages, including at least one of a plurality of files, are created based on all of the files in the presentation package storage folder corresponding to the presentation package designated to be delivered. In addition, the packages are delivered to an information display device in units of created packages. In this manner, it is possible to improve convenience because a plurality of programs can be delivered by a single delivery designation without transmitting delivery designations for respective programs.

Since the programs are delivered in units of packages, even if a transfer error occurs, only a package in which the transfer error occurs is retransmitted. Thus, a delivery time can be shortened.

Figure 1:
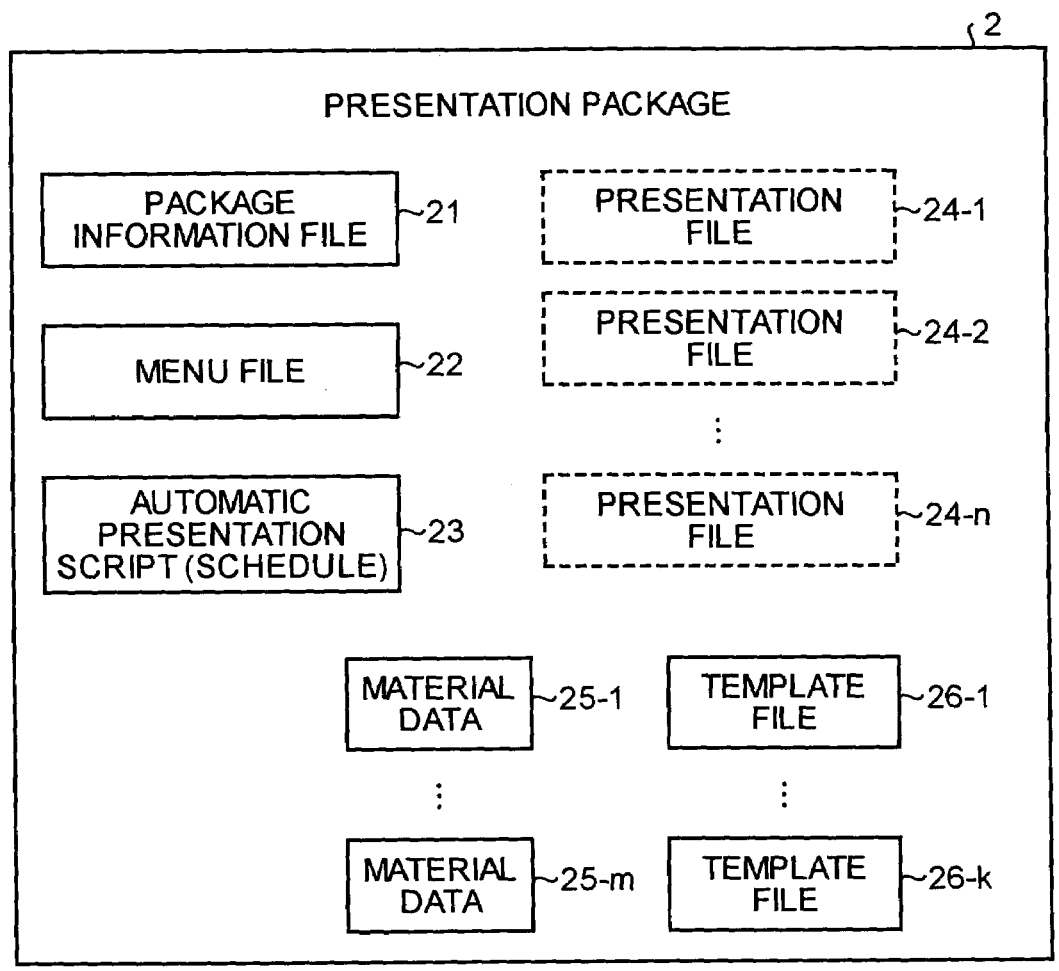
FIG. 1 is a diagram of the configuration of a presentation package serving as the largest unit of a file handled by an information delivery display system according to an embodiment of the present invention.

An example in the present invention will be described below with reference to FIGS. 1 to 13. FIG. 1 presents a structure of a presentation package 2 that is the largest unit of all the files handled by the information distribution display system of the example of the present invention. As shown in FIG. 1, the presentation package 2 is composed of a package information file 21, a menu file 22, an automatic presentation script 23, a plurality of presentation files 24-1 to 24-*n*, a plurality of material data 25-1 to 25-*m*, and a plurality of template files 26-1 to 26-*k*. The package information file 21, the menu file 22, the automatic presentation script 23, the presentation files 24-1 to 24-*n*, and the template files 26-1 to 26-*k* are typically control information files in which information used for display of programs composed of a plurality of material data (contents) is defined, and the material data (contents) 25-1 to 25-*m* are real display data displayed by the action of the above control information files.

The material data 25-1 to 25-*m* are content data used in the template files 26-1 to 26-*k*. The material data 25-1 to 25-*m* include, for example, animated image files, static image files, voice files, and voice animation image files. The animated image files may use an MPEG (Moving Picture Experts Group) format, or animation GIF (Graphic Interchange Format). Static image files may use a JPEG (Joint Photographic Coding Experts Group) format, PNG (Portable Network Graphics) format, GIF (Graphic Interchange Format), or TIFF (Tagged Image File Format). Voice files may use a MIDI (Musical Instruments Digital Interface) format, MP3 (MPEG Audio Layer-3) format, or WMA (Windows (R) Media Audio) format. Voice animation image files may include information of voices and animated images such as Flash format, text files, and the like.

The template files 26-1 to 26-*k* define display position information that shows display positions of one to a plurality of display areas (window) to display each material data, display sizes of the display areas, a playback player (linkage of a display area with a playback player) that is used for playback of the material data displayed in the corresponding display areas, and the like.

Figure 2:
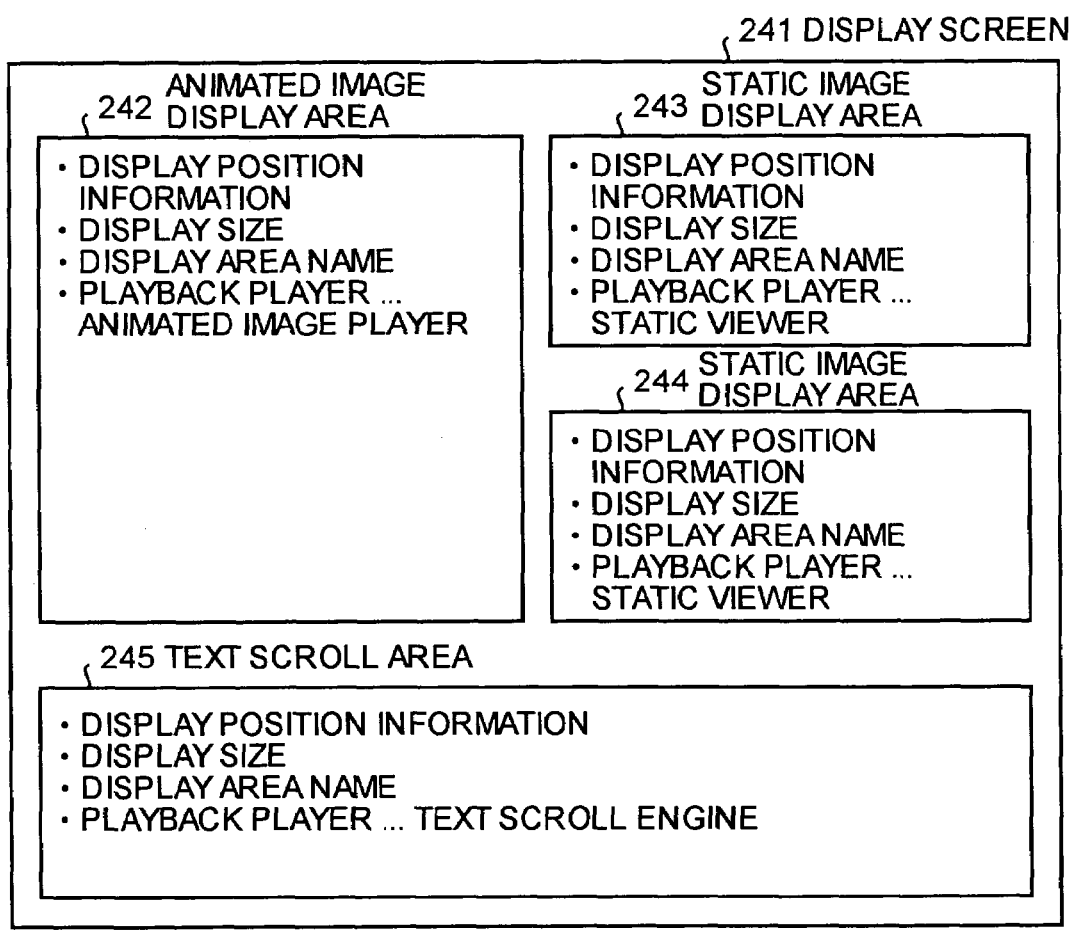
FIG. 2 is a diagram for explaining a template file shown in FIG. 1.

For example, as shown in FIG. 2, one program, which includes four areas of an animated image display area 242 that displays an MPEG format file, a static image display area 243 that displays a JPEG format file, a static image display area 244 that displays a PNG format file, and a text scroll area 245 that displays a text file, is assumed to be displayed on a display screen 241.

With respect to the animated image display area 242, the template file for playback defines display position information of a display area name that shows the animated image display area 242, its display size, and information linking the display area name that shows the animated image display area 242 with a playback player (in this case, a certain animated image player).

With respect to the static image display area 243, the template file for playback defines display position information of a display area name that shows the static image display area 243, its display size, and information linking the display area name that shows the static image display area 243 with a playback player (in this case, a certain static viewer).

With respect to the static image display area 244, the template file for playback defines display position information of a display area name that shows the static image display area 244, its display size, and information linking the display area name that shows the static image display area 244 with a playback player (in this case, a certain static viewer).

Finally, with respect to the text scroll area 245, the template file for playback defines display position information of a display area name that shows the text scroll area 245, its display size, and information linking the display area name that shows the text scroll area 245 with a playback player (in this case, a certain text scroll engine).

As describe above, a display position and a display size of each display area and information linking each display area with each playback player are defined in the template file. With the use of these definitions in the template file, a layout of the display screen 241 can be easily changed. In other words, a plurality of template files having different definitions are prepared in advance. As a result, it is possible to create different programs simply by changing a display layout of a template file or by changing material data to be displayed in each display area of the same template file.

Each of the presentation files 24-1 to 24-*n* defines one of the file names of the template files 26-1 to 26-*k*, and the information linking one or more of the described display areas (display area name) defined in the corresponding template file with one or more of material data 25-1 to 25-*m* (file name). For example, in FIG. 2, when the material data 25-1 is displayed in the animated image display area 242, the material data 25-2 is displayed in the static image display area 243, the material data 25-3 is displayed in the static image display area 244, and the material data 25-4 is displayed in the text scroll area 245, the linking information prescribed for such linkage can be defined in one certain presentation file 24-1. As is described, one presentation file corresponds to one program, and each of the presentation files 24-1 to 24-n is used for file management of the material data 25-1 to 25-m and the template files 26-1 to 26-k.

The menu file 22 defines the information defining the menu screen including the auto playback buttons with which an information viewer selects one program from a plurality of programs (corresponding to the plurality of presentation files 24-1 to 24-n), and defines the information linking the auto playback buttons (auto playback button names) with the file names of presentation files.

The automatic presentation script 23 defines, information prescribing a display starting time and a display ending time of each program, i.e., information associated with each display schedule of each program. In other words, one presentation file name is defined corresponding to one display starting time and one display ending time.

The package information file 21 defines each file name of the menu file 22 and the automatic presentation script 23. The package information file 21 is used for file management of these files 22 and 23. The menu file 22 and the automatic presentation script 23 manage the presentation files 24-1 to 24-n.

Figure 3:
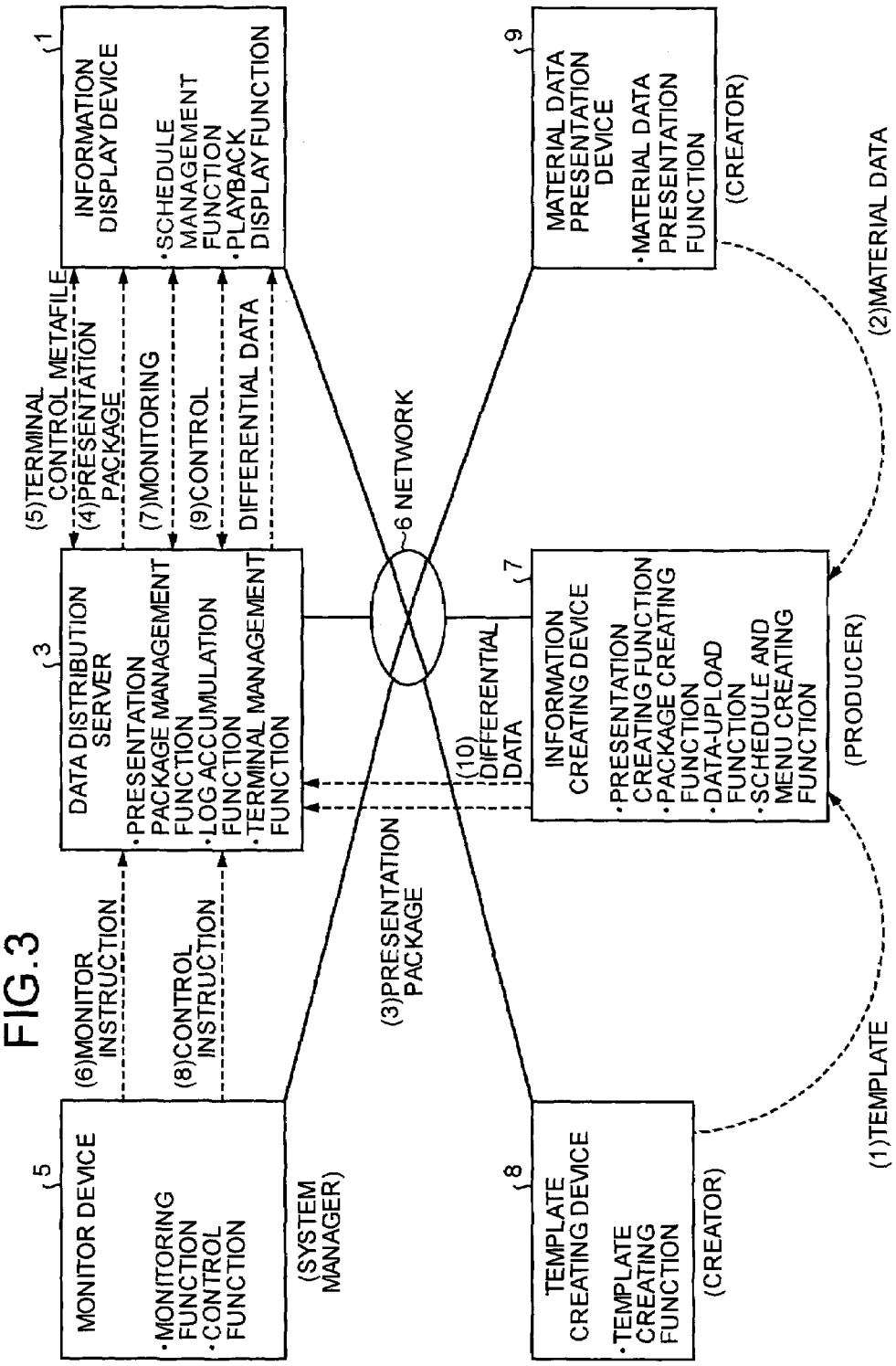
FIG. 3 is a system configuration diagram of the configuration of an information delivery display system according to the embodiment of the present invention.

FIG. 3 presents a system structure of the information distribution display system according to the example of the present invention. As shown in FIG. 3, the information distribution display system according to the example of the present invention is structured by communicably connecting a material data preparation device 9, a template creating device 8, an information creating device 7, a data distribution server 3, a monitor device 5, and an information display device 1 to one another through a network 6 such as the Internet.

The material data preparation device 9 is a machine such as a personal computer that is used by a creator to prepare the material data 25-1 to 25-m. The material data preparation device 9 is provided with a material data preparation function that prepares material data such as an animated image file, a static image file, text file, and a voice animation image file.

The template creating device 8 is a machine such as a personal computer used by a creator to create the template files 26-1 to 26-k. The template creating device 8 is provided with a template creating function that creates template files.

The information creating device 7 is a machine such as a personal computer used by a producer to create programs. The information creating device 7 creates all files included in the presentation package 2, as shown in FIG. 1, with the use of various material data prepared by the material data preparation device 9 and the template files created by the template creating device 8. The created presentation package is transmitted to the data distribution server 3 through the network 6.

The information creating device 7 is provided with a presentation creating function, a schedule and menu creating function, a package creating function, and data-upload function.

The presentation creating function is a function with which a producer creates a plurality of presentation files 24-1 to 24-n corresponding to a plurality of programs with the use of various material data 25-1 to 25-m prepared by the material data preparation device 9 and the template files 26-1 to 26-k created by the template creating device 8. Specifically, as described above, the producer defines a file name of one template file for every presentation file as well as the linkage of one or more of the described display areas (display area name) defined in one corresponding template file with one or more of the material data 25-1 to 25-m (file names). In addition, the presentation creating function is provided with a function that plays back the material data with the use of the template files defined in the presentation files to confirm the presentation files created by the producer and is provided with a function that displays the programs The schedule and menu creating function is a function that determines a display schedule of the programs defined in each presentation file created by the presentation creating function based on the priority information that shows the priority order of the display order among the respective presentation files designated by the producer, and that creates the automatic presentation script 23 and the menu file 22.

The package creating function creates the latest presentation package 2 when the menu file 22, the automatic presentation script 23, or the presentation files 24-1 to 24-n and the package information file 21 are created or changed.

The data-upload function is a function that transmits the presentation package 2 created by the package creating function to the data distribution server 3 through the network 6. In this case, the data-upload function creates a plurality of packages so that one or more files selected from a plurality of files contained in the presentation package 2 are contained in one package. Then, each of the created packages is encrypted and attached with package recognition information to transmit to the data distribution server 3 by the data-upload function. The package recognition information includes a presentation package name to which the package itself belongs, information that shows contents of the respective files contained in the package itself (for example, the files are composed of new material data 25-1 to 25-6, changed or updated data of the material data 25-1 to 25-8, or composed of new presentation files 24-1 to 24-10 and the menu file 22), and the like. In this case, the package corresponds to a group of files that is encrypted with the same key to be transmitted. When a package is created, the data-upload function judges whether the subject presentation package 2 is new or updated. When the presentation package is updated, a package containing only the updated files is created and transmitted by the data-upload function. This packaging intends to reduce the amount of data communicated. When the data amount is small, the data-upload function may encrypt the presentation package 2 itself and transmit it.

The data distribution server 3 monitors and controls the information display device 1 based on monitor instructions and control instructions of the monitor device 5. The data distribution server 3 is provided with a presentation package management function, a terminal management function, and a log accumulation function.

The presentation package management function not only stores packages received from the information creating device 7, but also judges, from the package recognition information whether the received package is a single package composing a new presentation package 2 or a package containing only updated files in the already-stored presentation package 2. When the package contains only updated files, the presentation package management function decodes the package stored therein and the package received from the information creating device 7, and only the updated portion (files in the package received from the information creating device 7) within the stored presentation package is changed, packed, encrypted, and stored by the presentation package management function. Moreover, when the package is one package composing a new presentation package 2, the presentation package management function receives all packages of the new presentation package 2, packs all the packages in a presentation pack, and then stores it.

The terminal management function transmits a transmission request for load information of a central processing unit (CPU) in the information display device 1 and information showing various conditions in the information display device 1, such as temperature of the displaying unit of the information display device 1 (hereinafter, referred to as monitoring information), to the information display device 1 based on monitor instructions from the monitor device 5 when accessed by polling from the information display device 1. Moreover, when accessed by polling from the information display device 1, the terminal management function transmits a download request for a presentation package or package to the information display device 1, transmits a switching instruction for a presentation package in a plurality of presentation packs that have already been stored in the information display device 1 to the information display device 1, and transmits a setting instruction for polling an interval change to the information display device 1 based on the control instructions from the monitor device 5.

The log accumulation function is a function to accumulate and store monitoring information transmitted from the information display device 1. Various data stored by the log accumulation function can be browsed from the monitor device 5.

The information display device 1 is a device for displaying the programs created by the information creating device 7. The information display device 1 is provided with a schedule management function and a playback display function and stores one or more presentation packs, which are encrypted packages or presentation packs downloaded from the data distribution server 3.

The schedule management function is used for management of a display schedule of programs based on the automatic presentation script 23 in the presentation package 2 and outputs a playback instruction that initiates playback of programs and a stop instruction that halts playback of the programs to the playback display function. The playback instruction is output when it is a program starting time that is defined in the automatic presentation script 23 or when an information viewer presses a certain program selection button on the menu screen to select a program. The playback instruction includes the file name of the presentation file corresponding to the program to be played back. The stop instruction is output when the time reaches a display ending time designated by the automatic presentation script 23 during displaying a program or when an information viewer selects a program different from the one in the middle of its playback on the menu screen.

Further, the schedule management function is also provided with a function that switches presentation packs within a plurality of presentation packs that have already been stored based on the control instruction transmitted from the monitor device 5 through the data distribution server 3.

Figure 4:
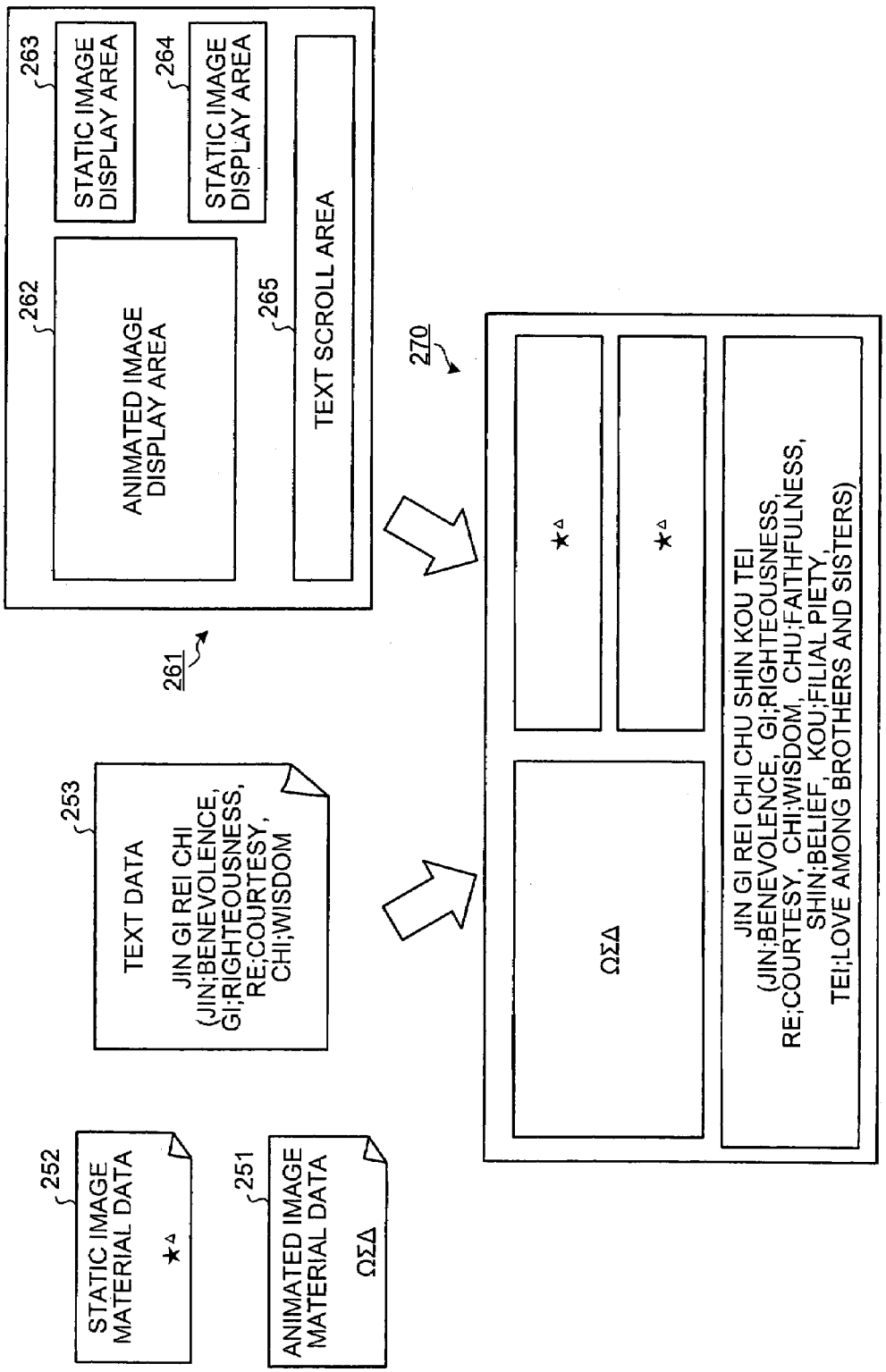
FIG. 4 is a diagram for explaining the concept of formation of different programs created by synthesizing one template file and material data.

The playback display function is a function that displays programs based on the presentation files contained in a playback instruction. The playback display function plays back one or more material data linked with one or more display areas of the template files that are defined in the presentation files with the use of each playback player in a corresponding display area and displays programs. For example, as shown in FIG. 4, assuming that a program is displayed by a template file 261 that defines an animated image display area 262, static image display areas 263 and 264, a text scroll area 265, animated image material data 251 linked with the animated image display area 262, static image material data 252 linked with the static image display areas 263 and 264, and text data 253 linked with the text scroll area 265, the animated image material data 251 are played back in the animated image display area 262, the static image material data 252 are played back in the static image display areas 263 and 264, and the text data 253 are played back in the text scroll area 265 by their respective playback players to display a program 270. When a template file is not defined in a presentation file, the playback display function displays a program with the use of a default template file that is stored in advance.

The monitor device 5 is a machine such as a personal computer on which a system manager monitors and controls the information display device 1 and is provided with a monitoring function and a control function. The monitoring function is a function that transmits a monitor instruction to retrieve monitoring information from the information display device 1 to the data distribution server 3. The control function is a function that transmits to the data distribution server 3 control instructions to control the information display device 1 such as a download request for a presentation package or a package, a switching instruction of presentation packs, and a setting instruction for polling interval change.

Although one each of the template creating device 8, the material data preparation device 9 and the information display device 1 is provided in the information distribution display system shown in FIG. 3, the information distribution display system may be provided with one or more of each of these devices.

Next, an action outline of the information distribution display system according to the example of the present invention is explained. First, an action to display a program on the information display device 1 is explained. The template creating device 8 transmits the template files 26-1 to 26-$k$ created by a creator, and the material data preparation device 9 transmits the material data 25-1 to 25-$m$ prepared by a creator to the information creating device 7.

The information creating device 7 creates files that are contained in the presentation package 2 shown in FIG. 1 with the use of the various material data 25-1 to 25-$m$ prepared by the material data preparation device 9 and the template files 26-1 to 26-$k$ created by the template creating device 8. The information display device 7 also encrypts the presentation package 2 or the package that has been created by the package creating function to transmit it to the data distribution server 3 through the network 6.

The data distribution server 3 stores the received presentation package 2 or the received package. The data distribution server 3 decides, based on package identification information, whether the package is one package constituting a new presentation package 2 or a package including only an updated file in the stored presentation package 2. When the package is one including an updated file, the presentation package management function decodes the stored package and the package received from the information creating device 7, updates only an updated part (i.e., the file of the package received from the information creating device 7) in the stored presentation pack, packages and encodes the package, and stores the packaged and encoded package. Thereafter, the data distribution server 3 causes the information display device 1 to download the stored presentation package 2 or the package based on a control designation from the monitor device 5.

The information display device 1 decodes the presentation package 2 or the package downloaded from the data distribution server 3, and plays back various material data to display programs with the use of the template files for display defined in the presentation files of the programs to be displayed based on the automatic presentation script 23 or the menu file 22 in the presentation package 2.

Next, an action to monitor the information display device 1 from the monitor device 5 is explained. The information display device 1 accesses the data distribution server 3 by polling at predetermined time intervals. When the data distribution server 3 is accessed by the information display device 1 and the monitor device 5 sends an instruction, the data distribution server 3 transmits a request for transmission of monitoring information to the information display device 1. The information display device 1 transmits monitoring information based on the request for transmission of monitoring information to the data distribution server 3. The data distribution server 3 resets the monitor instruction (a state of no monitor instruction present) from the monitor device 5 after storing the received monitoring information. In this way, the monitor device 5 makes an access to the data distribution server 3 with arbitrary timing and browses the monitoring information stored in the data distribution server 3 to monitor the conditions of the information display device 1.

Next, an action to control the information display device 1 from the monitor device 5 is explained. The information display device 1 accesses the data distribution server 3 by polling with predetermined timing. When the data distribution server 3 is accessed by the information display device 1 and the monitor device 5 sends a control instruction, the data distribution server 3 transmits the control instruction to the information display device 1. The information display device 1 carries out control based on the received control instruction.

When the control instruction is an instruction to download a presentation package 2 or a package, the information display device 1 requests the designated presentation package or package from the data distribution server 3 by the control instruction, and downloads the designated presentation package or package. When the control instruction is an instruction to switch the presentation packs, the information display device 1 switches the presentation packs from the currently used package to the designated presentation package using the schedule management function. Moreover, when the control instruction is an instruction to set the polling intervals, the information display device 1 sets the polling intervals so as to an access the data distribution server 3 at the intervals designated by the control instruction.

In a case where a GET method of HTTP (Hypertext Transfer Protocol) is used as a communication protocol between the data distribution server 3 and the information display device 1 by polling, communication is carried out using a metafile. In other words, the GET method of HTTP is used to access the data distribution server 3 from the information display device 1 at the predetermined polling intervals. At this time, terminal identification data (ID) (ID for every information display device 1) are attached. A terminal control metafile is sent from the data distribution server 3. The terminal control metafile includes an instruction file that allows control such as switching of the presentation packs. When a monitor instruction is sent from the data distribution server 3 by the terminal control metafile, monitoring items are sent to the data distribution server 3 as a terminal information metafile. When an instruction that commands to receive a terminal remote control metafile by the terminal control metafile is sent from the data distribution server 3, the information display device 1 accesses the data distribution server 3 to receive the terminal remote control metafile by the GET method of HTTP and to receive the terminal remote control metafile from the data distribution server 3. The information display device 1 is controlled based on the terminal remote control metafile. The polling intervals can be changed by the terminal remote control metafile from the data distribution server 3.

Figure 5:
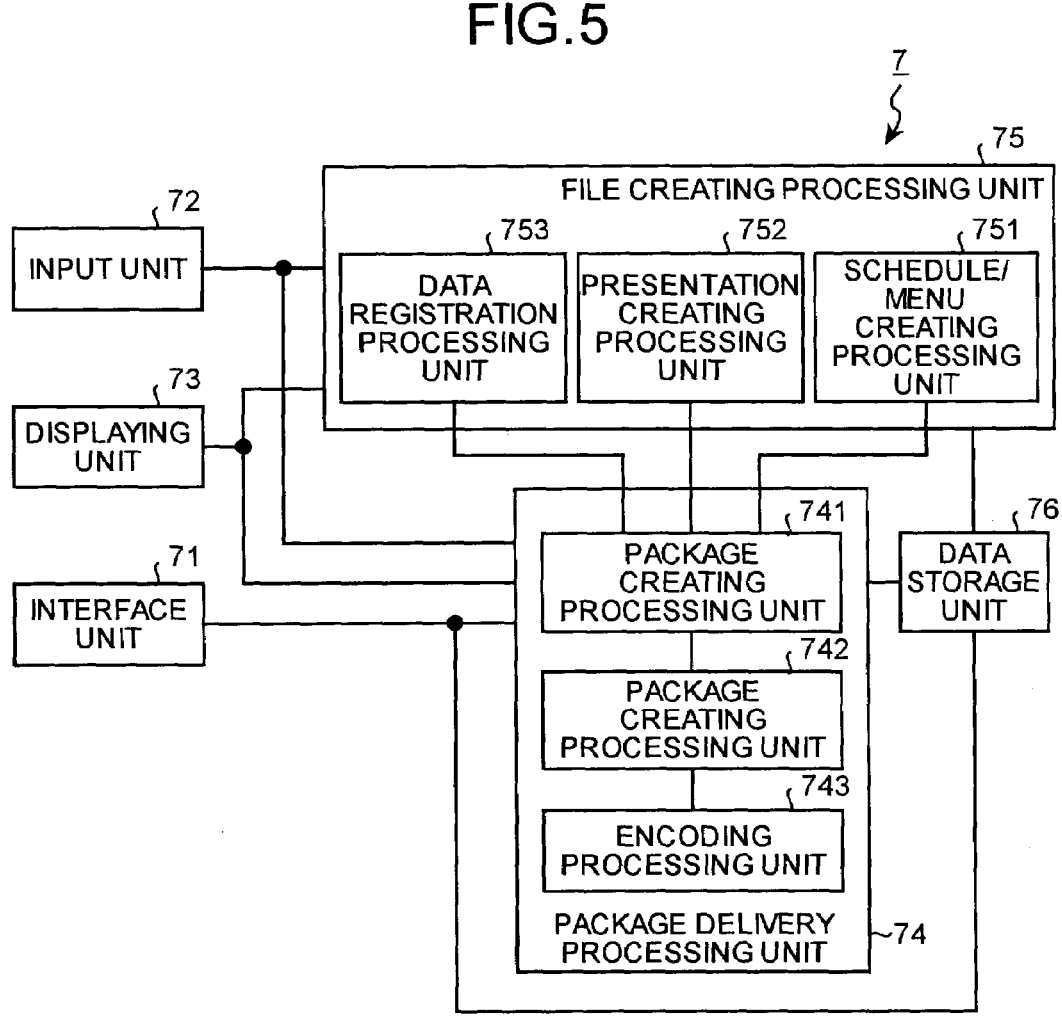
FIG. 5 is a block diagram of a configuration of the information creating device shown in FIG. 3.

FIG. 5 is a block diagram of a configuration of the information creating device 7 shown n FIG. 3. The information creating device 7 includes an interface unit 71, an input unit 72, a displaying unit 73, a package delivery processing unit 74, a file creating processing unit 75, and a data storage unit 76.

The interface unit 71 includes an interface function to perform mutual communication through the network 6 with the material data presentation device 9, the template creating device 8, and the data distribution server 3.

The input unit 72 can be implemented as a general input device such as a keyboard or a mouse and used as an input unit used by a producer to create various files (see FIG. 1) of the presentation package 2 or as an input unit to designate delivery of the presentation package 2.

The displaying unit 73 can be implemented as a general display device such as a Cathode-Ray Tube (CRT) or a liquid crystal display and used as a displaying unit that displays programs defined by the various files 21 to 23, 24-1 to 24-$n$, 25-1 to 25-$m$, and 26-1 to 26-$k$ of the presentation package 2 stored in the data storage unit 76 or the presentation files 24-1 to 24-$n$.

The data storage unit 76 hierarchically stores the various material data 25-1 to 25-$m$ created by the material data presentation device 9, the template files 26-1 to 26-$k$ created by the template creating device 8, the presentation files 24-1 to 24-$n$ created by the information creating device 7, the package information file 21, the menu file 22, and the automatic presentation script 23, i.e., the various files included in the presentation package 2.

Figure 6:
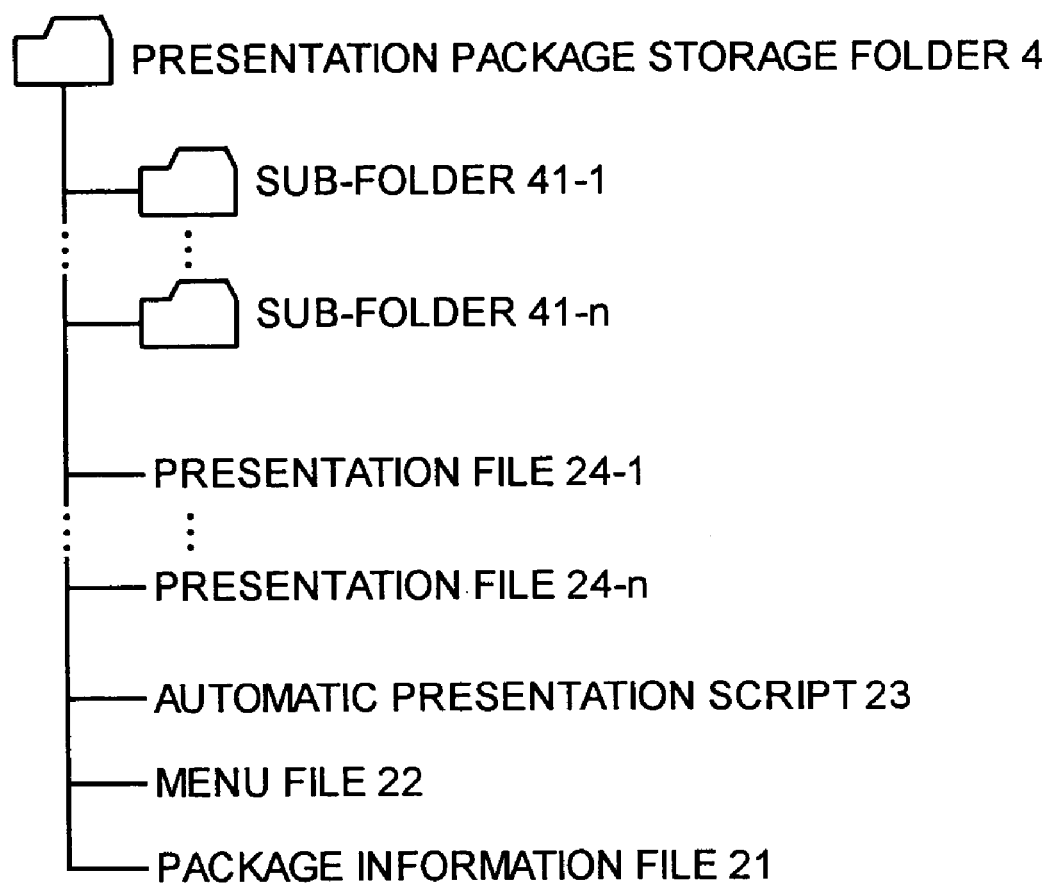
FIG. 6 is a conceptual diagram of a configuration of data stored in a data storage unit in which the presentation package shown in FIG. 1 is hierarchically stored.

FIG. 6 is a conceptual diagram of a data configuration in which the presentation package 2 shown in FIG. 1 is hierarchically stored in the data storage unit 76. The various files 21 to 23, 24-1 to 24-$n$, 25-1 to 25-$k$, 26-1 to 26-$m$ constituting the presentation package 2 shown in FIG. 1 are stored in a presentation package storage folder 4. More specifically, in this case, one presentation package 2 corresponds to one presentation package storage folder 4. The presentation package storage folder 4 comprises the package information file 21, the menu file 22, the automatic presentation script 23, the presentation files 24-1 to 24-$n$, and n sub-folders 41-1 to 41-$n$ corresponding to the presentation files 24-1 to 24-$n$. The sub-folders 41-1 to 41-$n$ comprise the template files defined by the presentation files 24-1 to 24-$n$ and at least one material data. For example, when the template file 26-1 and the material data 25-1 and 25-2 are defined in the presentation file 24-1, the template file 26-1 and the material data 25-1 and 25-2 are stored in the sub-folder 41-1 corresponding to the presentation file 24-1. In other words, the template file and at least one material data used in one program are stored in the sub-folder.

The data storage unit 76 stores a transmission history of the presentation package 2. The transmission history includes the name of the transmitted presentation package 2, the file names of the various files 21, 22, 23, 24-1 to 24-$n$, 25-1 to 25-$m$, and 26-1 to 26-$k$ in the presentation package 2, and creation dates of the files.

The file creating processing unit 75 has a data registration processing unit 753, a presentation creating processing unit 752, and a schedule/menu creating processing unit 751. The file creating processing unit 75 performs a formation process of various files included in the presentation package 2.

The data registration processing unit 753 includes a data registration function that associates programs, i.e., template files, respectively defined by the presentation files 24-1 to 24-$n$ and at least one material data with the presentation files 24-1 to 24-$n$, respectively, and stores the template files and the material data in the data storage unit 76.

The presentation creating processing unit 752 is a processing unit that performs the presentation creating function. The presentation creating processing unit 752 creates the presentation files 24-1 to 24-$n$ corresponding to a plurality of programs by using the various material data 25-1 to 25-$m$ created by the material data presentation device 9 and the template files 26-1 to 26-$k$ created by the template creating device 8.

The schedule/menu creating processing unit 751 is a processing unit that performs the schedule/menu creating function. The schedule/menu creating processing unit 751 determines display schedules of presentation files created by the presentation creating processing unit 752 based on display priority information representing a display order of priority of the presentation files designated by a producer to create the automatic presentation script 23 and the menu file 22.

The package delivery processing unit 74 includes a package creating processing unit 741, a package creating processing unit 742, and an encoding processing unit 743 and performs a delivery process of the presentation package 2.

The package creating processing unit 741 is a processing unit that performs the package creating function. When the package creating processing unit 741 receives a package creating designation output when the package information file 21, the menu file 22, the automatic presentation script 23, or the presentation files 24-1 to 24-$n$ are created or changed, the package creating processing unit 741 creates one presentation package 2 including all files (including files registered in the sub-folders 41-1 to 41-$n$) of all the files registered in the presentation package storage folder 4 in which the files 21, 22, 23, and 24-1 to 24-$n$ are registered.

The package creating processing unit 742 and the encoding processing unit 743 are processing units that perform the uploading function. The package creating processing unit 742 creates a plurality of packages from the files included in the presentation package 2 such that at least one file is included in one package. The animated image display area 242 creates a transmission history of the created packages and stores the created transmission history in the data storage unit 76.

The encoding processing unit 743 encodes the packages created by the package creating processing unit 742 and adds package identification information to the packages.

Figure 7:
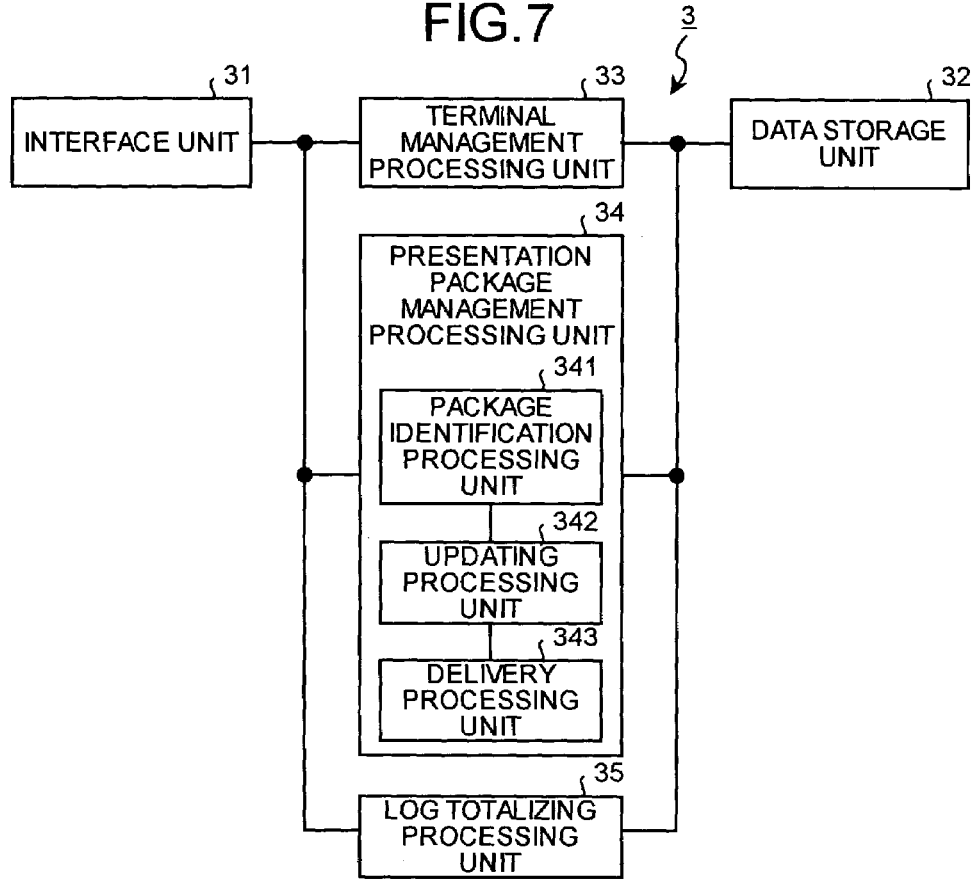
FIG. 7 is a block diagram of a configuration of the data distribution server shown in FIG. 3.

FIG. 7 is a block diagram of a configuration of the data distribution server 3 shown in FIG. 3. The data distribution server 3 includes an interface unit 31, a terminal management processing unit 33, a presentation package management processing unit 34, a log totalizing processing unit 35, and a data storage unit 32.

The interface unit 31 includes an interface function to perform mutual communication with the information creating device 7, the monitor device 5, and the information display device 1.

The data storage unit 32 stores the presentation package 2 or the package transmitted from the information creating device 7. The data storage unit 32 stores a delivery history, which can include an updating history and a transmission history. The updating history includes an updated file name in the package, an update date of the file, and a presentation package name to which the package belongs. The transmission history includes a presentation package name delivered to the information display device 1 and a transmission date of the presentation package name. The data storage unit 32 stores monitor information totalized by the log totalizing processing unit 35.

The presentation package management processing unit 34 is a processing unit that performs the presentation package management function and includes a package identification processing unit 341, an updating processing unit 342, and a delivery processing unit 343.

The package identification processing unit 341 decides, based on the package identification information, whether the package received from the information creating device 7 is one package constituting the presentation package 2 or a package including only an updated file in the stored presentation package 2.

When the received package is an updated file, the updating processing unit 342 updates the file in the package stored in the data storage unit 32 with the file of the received package. When the file in the package is updated, the updating processing unit 342 creates an updating history to store the created updating history in the data storage unit 32.

The delivery processing unit 343 transmits a package belonging to a requested presentation package in response to a presentation package request from the information display device 1. The delivery processing unit 343 decides whether the requested presentation package is newly delivered or is delivered in advance. When the presentation package is delivered in advance, the delivery processing unit 343 creates a package including only the updated file to transmit the package. The delivery processing unit 343 creates a transmission history when the package is transmitted, and stores the created transmission history in the data storage unit 32.

The terminal management processing unit 33 is a processing unit that performs the terminal management function. When the information display device 1 accesses the terminal management processing unit 33 by polling, the terminal management processing unit 33 transmits to the information display device 1 a transmission request of monitor information of the information display device 1, such as load information of the CPU of the information display device 1 and a temperature of the displaying unit of the information display device 1, based on the monitor designation from the monitor device 5. When the information display device 1 accesses the terminal management processing unit 33 by polling, the terminal management processing unit 33 transmits a download request of a presentation package or a package to the information display device 1, transmits a switching designation of a presentation package in a plurality of presentation packs stored in the information display device 1 to the information display device 1, or transmits a change setting designation of a polling interval to the information display device 1 based on a control designation from the monitor device 5.

The log totalizing processing unit 35 is a processing unit that performs the log totalizing function. The log totalizing processing unit 35 totalizes monitor information transmitted from the information display device 1 and stores the totalized monitor information in the data storage unit 32.

Figure 8:
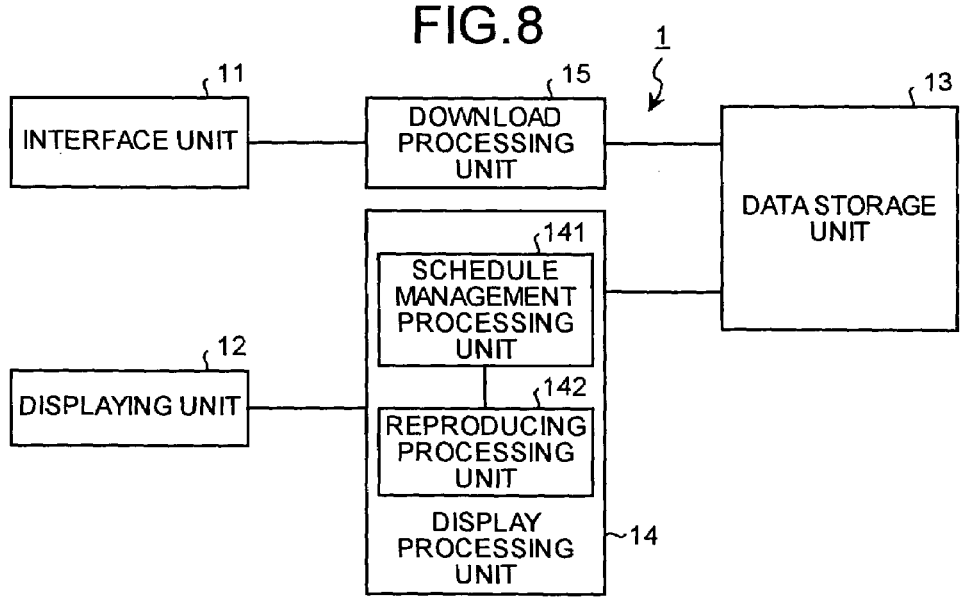
FIG. 8 is a block diagram of the information display device shown in FIG. 3.
Figure 9:
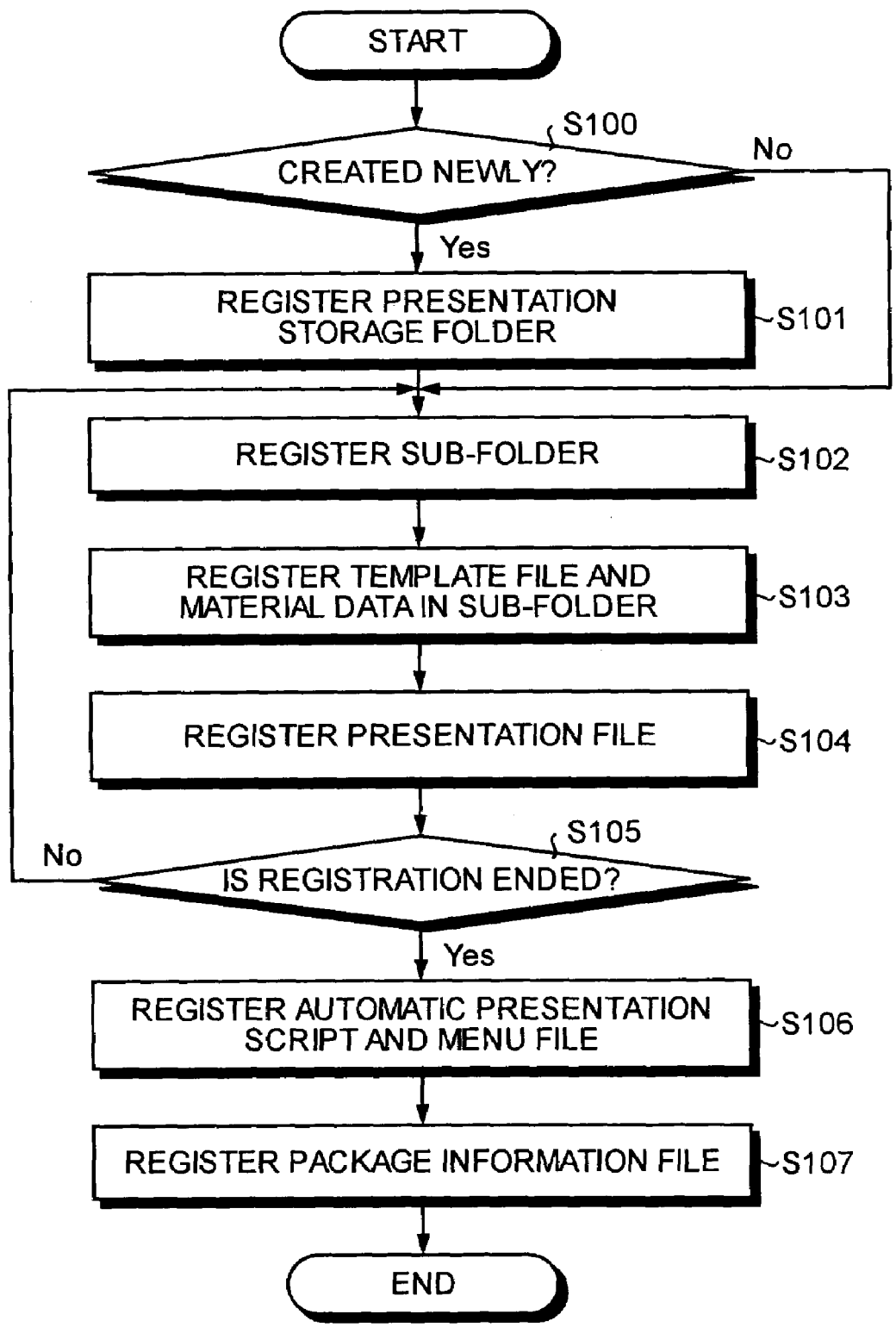
FIG. 9 is a flowchart for explaining an operation performed when he information creating device creates a presentation pack.

FIG. 8 is a block diagram of the configuration of the information display device 1 shown in FIG. 3. The information display device 1 includes an interface unit 11, a displaying unit 12, a download processing unit 15, a display processing unit 14, which includes a schedule management processing unit 141 and a reproducing processing unit 142, and a data storage unit 13.

The interface unit 11 includes an interface function to perform mutual communication with the data distribution server 3 through the network 6. The data storage unit 13 stores at least one presentation package 2 created by the information creating device 7 based on a control designation transmitted from the monitor device 5 through the data distribution server 3. When the presentation package 2 is stored, as shown in FIG. 6, the data is stored hierarchically.

The download processing unit 15 decodes the package downloaded in response to a download request of the package from the data distribution server 3 and decompresses the decoded package to store it in the data storage unit 13.

The schedule management processing unit 141 is a processing unit that performs the schedule management function. The schedule management processing unit 141 manages display schedules of programs based on the automatic presentation script 23 in the presentation package 2. When it is detected that any one of a plurality of program selection buttons displayed on the displaying unit 12 or a menu screen displaying unit (not shown) is selected through the menu file 22, the display schedules are changed such that the presentation file corresponding to the detected program selection button is reproduced.

The reproducing processing unit 142 reproduces at least one material data associated with at least one display area of a template file defined in a presentation file by using playback players of the display areas to display a program on the displaying unit 12, which can be implemented as, for example, a CRT, a liquid crystal display, or a plasma display.

An operation of the information delivery display system according to the example of the present invention will be described below with reference to the flowcharts shown in FIGS. 9 to 13. An operation is performed when the information creating device 7 creates the presentation package 2. In this case, it is assumed that the material data 25-1 to 25-*m* created by the material data presentation device 9 and the template files 26-1 to 26-*k* created by the template creating device 8 are stored in the data storage unit 76 in advance.

A producer inputs the folder name of the presentation package storage folder 4 corresponding to the presentation package 2 created or edited by using the input unit 72.

The data registration processing unit 753 decides whether the folder name input from the input unit 72 is newly created (step S100). More specifically, the data registration processing unit 753 retrieves folder names registered in the data storage unit 76 by using the input folder name as a retrieval key. The data registration processing unit 753 determines whether a folder name equal to the input folder name is present in the data storage unit 76.

When the input folder name is newly registered (i.e., the input folder name is not present in the data storage unit 76), the data registration processing unit 753 registers (i.e., stores) the presentation package storage folder 4 of the input folder name in the data storage unit 76 (step S101).

A producer inputs the folder name of a sub-folder corresponding to a program (presentation file) by using the input unit 72. The data registration processing unit 753 registers the folder of the input folder name in the presentation package storage folder 4 of the data storage unit 76. (step S102)

The producer inputs the material data 25-1 to 25-*m* stored in the data storage unit 76 by using the input unit 72, inputs a template file used in the program and selected from the template files 26-1 to 26-*k*, and inputs material data corresponding to the number of display areas of the template file.

The data registration processing unit 753 registers the template file of the file name input from the input unit 72 and the material data input from the input unit 72 in the created sub-folder (step S103). For example, when the producer wants to create the program 270 shown in FIG. 4, the producer inputs the file name of the template file 261, the file name of the animated image material data 251, the file name of the static image material data 252, the file name of the text data 253, and the name of the formed sub-folder. When the formed sub-folder is the sub-folder 41-1, the data registration processing unit 753 registers the template file 261, the animated image material data 251, the static image material data 252, and the text data 253 in the sub-folder 41-1.

The producer uses the input unit 72 to input the file name of a template file registered in the sub-folder and to input the association between at least one display area name of the template file registered in the sub-folder and the file name of the material data. For example, when the producer wants to create the program 270 shown in FIG. 4, the producer inputs the file name of the template file 261, inputs the animated image material data 251 in the animated image display area 262, inputs the static image material data 252 in the static image display areas 263 and 264, and inputs the text data 253 in the text scroll area 265.

The presentation creating processing unit 752 creates a presentation file of a predetermined format based on the file name of the template file input from the input unit 72 and the association between at least one display area of the template file and the file name of the material data and registers the presentation file in the presentation package storage folder 4 (step S104). The producer may directly edit the presentation file.

The presentation creating processing unit 752 registers the presentation file in the presentation package storage folder 4 and then output a package creating designation to the package creating processing unit 741.

Each time the sub-folder name, the file name of the template file to be registered in the sub-folder, the file name of the material data, the file name of the template file, and the association between at least one display area name of the template file and the file name of the material data are input, the data registration processing unit 753 creates a sub-folder to register the template file and the material data in the formed sub-folder. The presentation creating processing unit 752 repeats the registration operation of the presentation file based on the file name of the template file and the association between the at least one display area name of the template file and the file name of the material data (steps 102 to S105). The presentation creating processing unit 752 registers the sub-folders 41-1 to 41-*n* and the presentation files 24-1 to 24-*n* in the presentation package storage folder 4.

The producer registers in the sub-folders 41-1 to 41-*n* at least one of the presentation files 24-1 to 24-*n* serving as a program and the template files 26-1 to 26-*k* and the material data 25-1 to 25-*m* defined in at least one of the presentation files 24-1 to 24-*n*. In addition, the producer uses the input unit 72 to input display priority information representing a display order of priority of the formed presentation files 24-1 to 24-*n*.

The schedule/menu creating processing unit 751 determines display schedules of the presentation files formed by the presentation creating processing unit 752 based on the input display priority information and associates the display schedule with one display starting time and one display end time. The schedule/menu creating processing unit 751 creates the automatic presentation script 23 in which one presentation file name is defined and registers the automatic presentation script 23 in the presentation package storage folder 4. The schedule/menu creating processing unit 751 creates the menu file 22, which includes information that defines a menu screen including program selection buttons used by an information viewer to select one program from a plurality of programs (corresponding to the presentation files 24-1 to 24-n) and defines association information between the program selection buttons (program selection button names) and the file names of the presentation files. The schedule/menu creating processing unit 751 also registers the menu file 22 in the presentation package storage folder 4 (step S106).

The presentation creating processing unit 752 registers the automatic presentation script 23 and the menu file 22 in the presentation package storage folder 4 and outputs a package creating designation to the package creating processing unit 741.

The producer uses the input unit 72 to input the automatic presentation script 23, the menu file 22, and the file name of the presentation files 24-1 to 24-n in the presentation package 2.

The data registration processing unit 753 creates the package information file 21, which defines the input automatic presentation script 23, the menu file 22, and the file names of the presentation files 24-1 to 24-n and registers the package information file 21 in the presentation package storage folder 4 (step S107). The data registration processing unit 753 registers the package information file 21 and outputs the package creating designation to the package creating processing unit 741.

On the other hand, when the folder name input from the input unit 72 has been registered (i.e., when the input folder name is present in the data storage unit 76), the data registration processing unit 753 either newly registers a sub-folder or a presentation file in the registered presentation package storage folder 4 without creating a new folder or updates the registered sub-folders 41-1 to 41-n, the presentation files 24-1 to 24-n, the automatic presentation script 23, the menu file 22 or the package information file 21 (steps S102 to step S107).

In this manner, the presentation package 2 shown in FIG. 1 is formed by the data registration processing unit 753, the presentation creating processing unit 752, and the schedule/menu creating processing unit 751. In addition, the presentation package 2 is stored in the data storage unit 76 with a data structure shown in FIG. 6.

Figure 10:
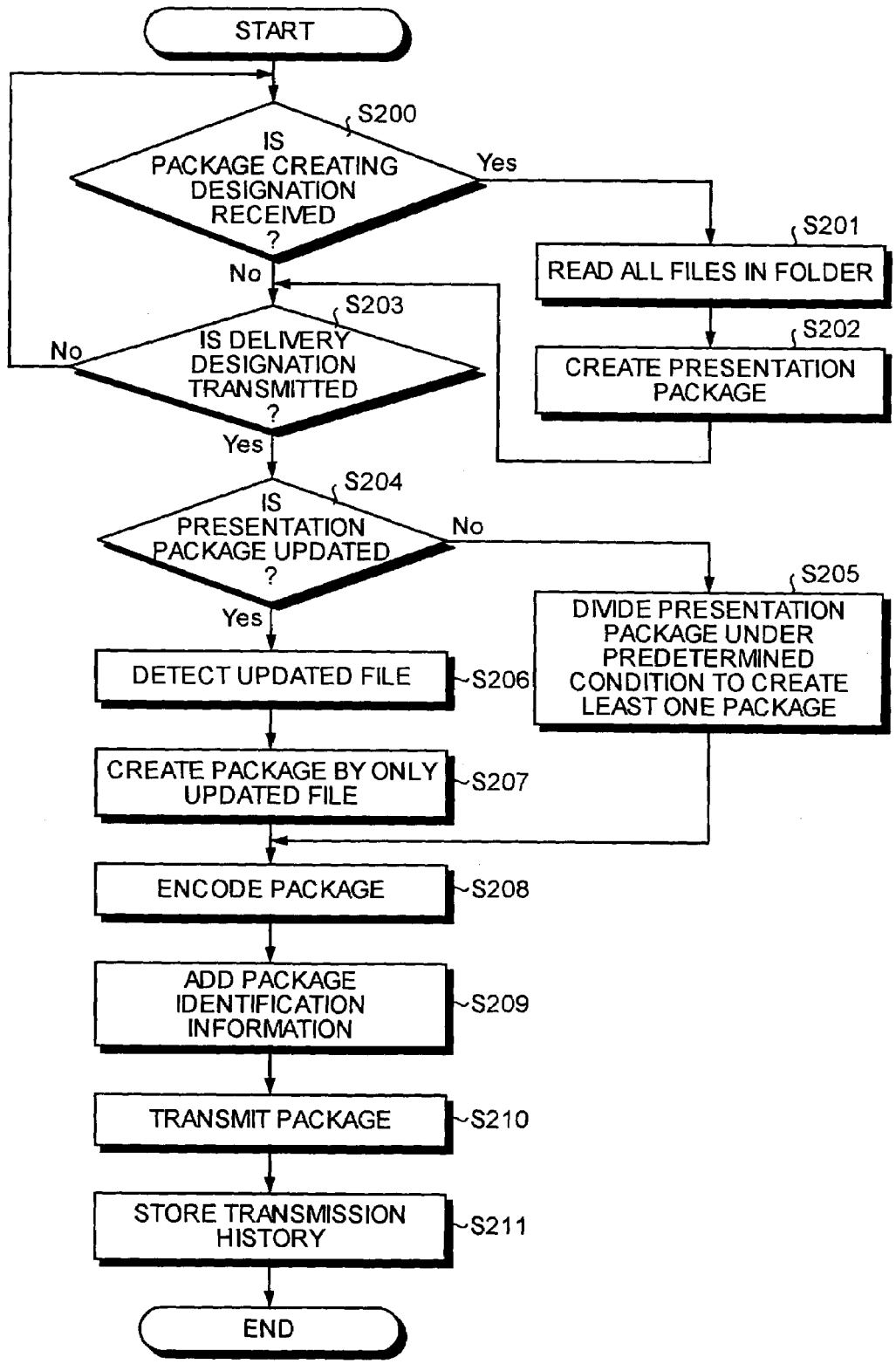
FIG. 10 is a flowchart for explaining an operation performed by the information creating device when the information creating device transmits the presentation package to a data distribution server 3.

An operation performed when the information creating device 7 transmits the presentation package 2 to the data distribution server 3 will be described below with reference to a flowchart in FIG. 10.

The package creating processing unit 741 registers the presentation files 24-1 to 24-n, the automatic presentation script 23, the menu file 22, or the package information file 21 in the data storage unit 76. Thereafter, when the package creating processing unit 741 receives the package creating designation output from the data registration processing unit 753, the presentation creating processing unit 752, or the schedule/menu creating processing unit 751 (step S200), the package creating processing unit 741 reads all the files registered in the presentation package storage folder 4 from the data storage unit 76 including the files registered in the sub-folders 41-1 to 41-n (step S201). The package creating processing unit 741 packages all the files read from the data storage unit 76 to create a presentation package 2 (step S202). More specifically, the package creating processing unit 741 form one presentation package 2 to include the package information file 21, the automatic presentation script 23, the menu file 22, the presentation files 24-1 to 24-n, the template files 26-1 to 26-k, and the material data 25-1 to 25-m.

The producer inputs a delivery designation of the presentation package 2 by using the input unit 72. The delivery designation may be, e.g., a specific command, or may be realized by the following method. That is, the data structure of the presentation package storage folder 4 shown in FIG. 6 may be displayed on the displaying unit 12, and the package information file 21 may be selected.

In response to the delivery designation, the package creating processing unit 742 decides whether the presentation package 2 designated to be delivered is an updated presentation package or a new presentation package (step S203 and step S204). More specifically, the package creating processing unit 742 reads a transmission history from the data storage unit 76 and retrieves a presentation package name of the transmission history by using the presentation package name to be transmitted as a retrieval key.

When the presentation package names of the transmission history do not include the presentation package name to be transmitted, the presentation package is a new presentation pack. Therefore, the package creating processing unit 742 creates a plurality of packages such that the packages include at least one file in the presentation package 2 created by the package creating processing unit 741 based on predetermined conditions (step S205).

The predetermined conditions may be, for example, (1) A file having a file size larger than a predetermined threshold value constitutes one package;

(2) Files having the same extension representing the attribute of a file constitute one package; and (3) Files registered in the same sub-folder constitute one package.

The package creating processing unit 742 creates a package to satisfy at least one of the three conditions.

The package creating processing unit 742 creates a transmission history including the name of the transmitted presentation package 2, the file names of the various files 21, 22, 23, 24-1 to 24-n, 25-1 to 25-m, and 26-1 to 26-k in the presentation package 2, and the creation dates of the files.

When the presentation package names of the transmission history include the presentation package name to be transmitted, the package creating processing unit 742 compares the file names and the creation dates in the presentation package 2 with the file names and the creation dates of the transmission history to retrieve a mismatched file and to detect an updated file of the presentation package 2 (step S206).

The package creating processing unit 742 creates at least one package based on the predetermined conditions by using the detected updated file as a target (step S207). The package creating processing unit 742 changes a transmission history related to the updated file of the formed package.

The encoding processing unit 743 encodes the package created by the package creating processing unit 742 and then transmits the package to the data distribution server 3 through the interface unit 31 together with package identification information (steps S208 to S210).

After it is confirmed that the created package is transmitted to the data distribution server 3, the package creating processing unit 742 stores the created or updated transmission history in the data storage unit 76 (step S210).

Figure 11:
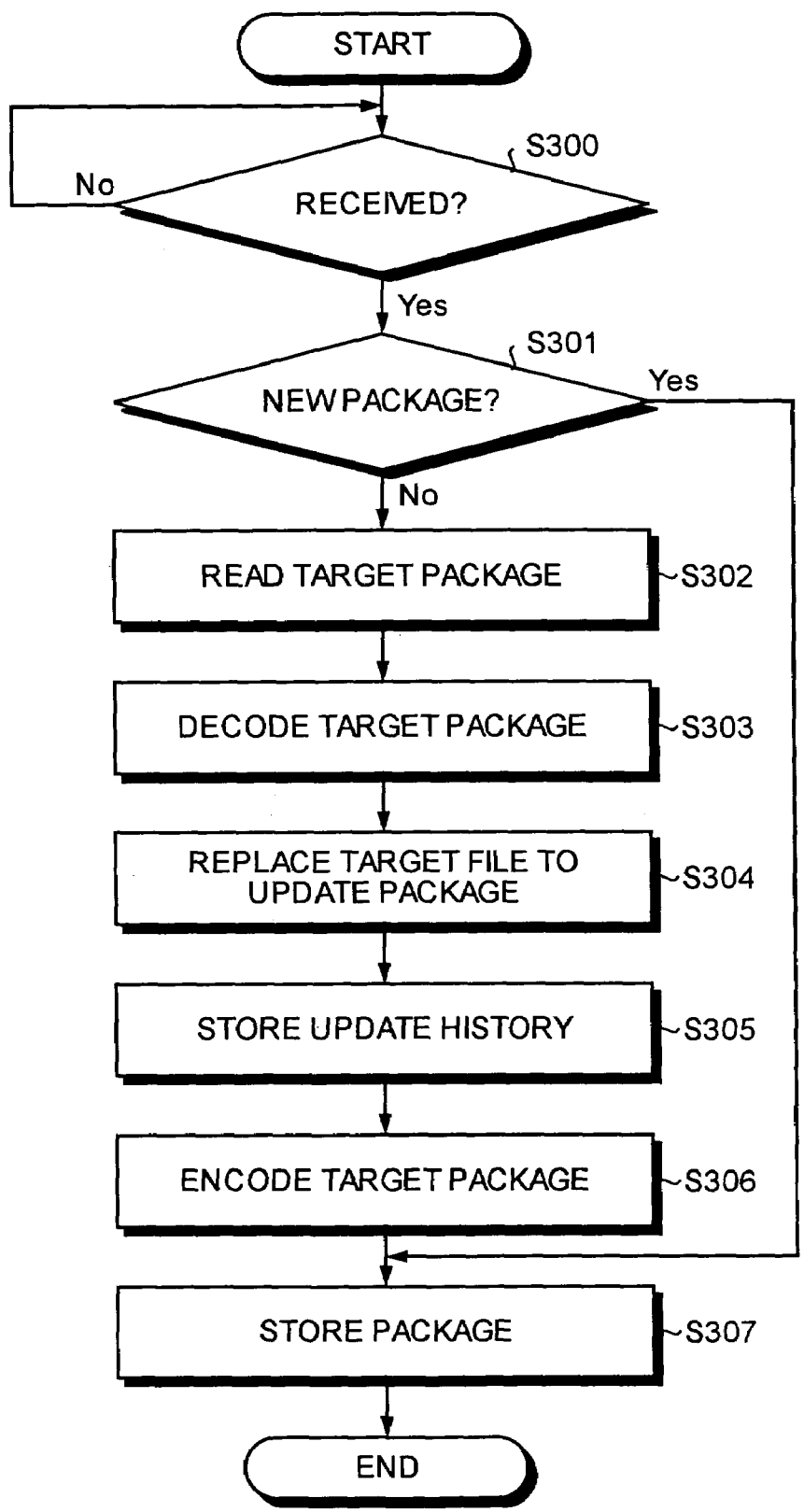
FIG. 11 is a flowchart for explaining an operation performed when the data distribution server stores the package received from the information creating device.

An operation performed when the data distribution server 3 stores a package received from the information creating device 7 will be described below with reference to a flowchart in FIG. 11. When the package identification processing unit 341 receives the package through the interface unit 31 (step S300), the package identification processing unit 341 decides, based on the package identification information, whether the received package is one package constituting a new presentation package 2 or a package including only an updated file in the presentation package stored in the data storage unit 32 (step S301). As described above, the package identification information includes a presentation package name to which the corresponding package belongs, information representing the contents of a file included in the corresponding package (for example, the file may include new data 25-1 to 25-6 or data obtained by changing and updating the material data 25-1 to 25-8, or the file may include new presentation files 24-1 to 24-10 and the menu file 22), or other relevant information. The package identification processing unit 341 analyzes the package identification information to decide whether the received package is an updated file. When the package is an updated file, an updating designation is output to the updating processing unit 342.

When the updating processing unit 342 receives the updating designation, the updating processing unit 342 reads the package including the updated file from the data storage unit 32 and decodes the read package (steps S302 and S303). An old file in the read package is replaced with the updated file in the received package to update the package (step S304). The updating processing unit 342 creates an updating history and stores the created updating history in the data storage unit 32 (step S305). The updating processing unit 342 encodes the updated package and stores the encoded package in the data storage unit 32 (steps S306 and S307).

Figure 12:
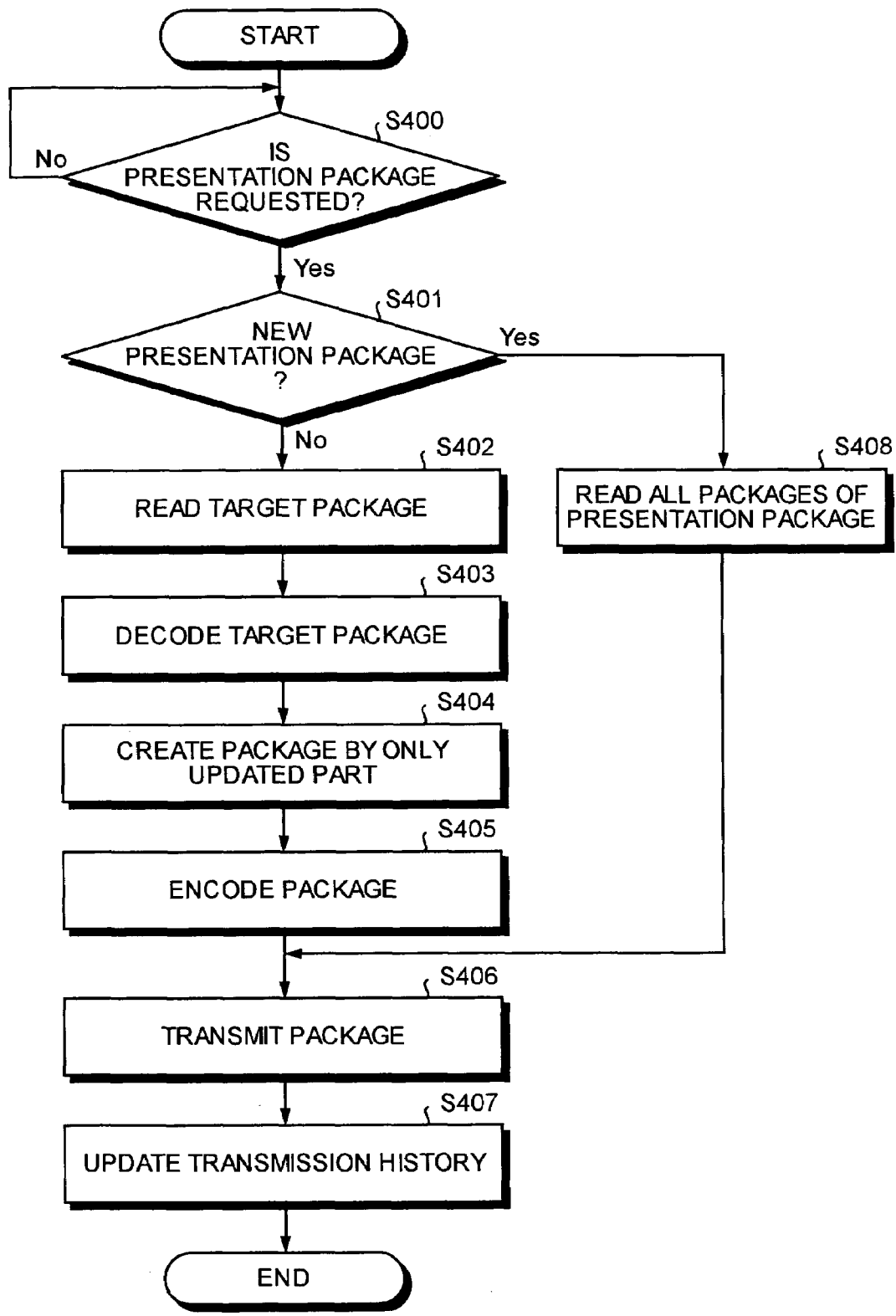
FIG. 12 is a flowchart for explaining an operation performed when the package stored in the data distribution server 3 is downloaded on an information display device 1.

An operation that downloads a package stored in the date distribution server 3 on the information display device 1 will be described below with reference to a flowchart in FIG. 12.

When the delivery processing unit 343 receives a download request from the information display device 1 through the interface unit 31, the delivery processing unit 343 decides whether the requested presentation package 2 is a new presentation package 2 (steps S400 and S401). More specifically, the delivery processing unit 343 retrieves a presentation package name of the transmission history stored in the data storage unit 32 by using the requested presentation package name as a retrieval key to decide whether a presentation package name equal to the requested presentation package name is present in the transmission history.

When the requested presentation package 2 has been delivered (i.e., when the requested presentation package name is present in the transmission history), the delivery processing unit 343 reads the package including the updated file from the data storage unit 32 (step S402). More specifically, the delivery processing unit 343 compares the transmission date of the requested presentation package 2 in the transmission history with the update date of the file of the package belonging to the requested presentation package 2 in the transmission history and reads the package including the file having an update date later than the transmission date from the data storage unit 32.

The delivery processing unit 343 decodes the read package and creates a package with the updated file only (steps S403 and S404). The delivery processing unit 343 encodes the created package, transmits the encoded package to the information display device 1 through the interface unit 31, updates the transmission history, and stores the updated transmission history in the data storage unit 32 (steps S405 to S407).

On the other hand, when the requested presentation package 2 is not delivered (i.e., when the requested presentation package name is not present in the transmission history), the delivery processing unit 343 reads all of the packages belonging to the requested presentation package 2 from the data storage unit 32 (step S408). The delivery processing unit 343 transmits all of the read packages to the information display device 1 through the interface unit 31, creates a transmission history, and stores the transmission history in the data storage unit 32 (steps S406 and S407).

When the download processing unit 15 of the information display device 1 receives the package from the data distribution server 3 through the interface unit 11, the download processing unit 15 decodes and decompresses the received package and stores the resultant package in the data storage unit 13.

An operation performed when the information display device 1 displays a program by using the delivered presentation package 2 will be described below with reference to a flowchart in FIG. 13. The schedule management process unit 141 includes a timer function. When the program start time is defined in the automatic presentation script 23, the schedule management process unit 141 outputs to the reproducing process unit 142 a reproducing designation, which includes a presentation file name defined in response to the program start time (steps S500 and S520). When the schedule management process units 141 detects that a program selection button is touched, the schedule management processing unit 141 outputs to the reproducing processing unit 142 a reproducing designation, which includes a presentation file name corresponding to the detected program selection button defined on the menu file 22 (steps S500 and S510).

The reproducing process unit 142 reads the presentation file included in the reproducing designation from the data storage unit 13 (step S530). The reproducing process unit 142 reads a template file and a material file defined in the presentation file read from the data storage unit 13 (step S540). The reproducing process unit 142 reproduces at least one material data associated with at least one display area of the template file defined in the read presentation file by using playback players of the corresponding display areas to display a program on the displaying unit 12 (step S550). More specifically, as described above, display position information, which are defined in the template file, represent a display position of at least one display area (e.g., a window) to display the material data, the display size of the display area, playback players (according to the association between the display areas and the playback players) used to reproduce the material data displayed on the display areas, and other relevant information. Association information between at least one display area (display area name) defined in the template file and at least one of the material data 25-1 to 25-$m$ (file names) is defined in the presentation file. The reproducing process unit 142 determines a display area in the display unit 12 on the basis of the display position information representing the display position of the display area defined in the template file and the display size of the display area. The material data corresponding to the display area defined in the presentation file is reproduced by using the playback player of the display area defined in the template file to synthesize the material data, thereby displaying one program on the display unit 12.

As described above, in the information delivery display system according to the embodiment, the file creating processing unit 75 creates the package information file 21, the automatic presentation script 23, the menu file 22, the presentation files 24-1 to 24-n, the material data 25-1 to 25-m, and the template files 26-1 to 26-k in the presentation package storage folder 4 corresponding to the presentation package 2. When the package creating processing unit 742 receives a delivery designation, the package creating processing unit 742 creates at least one package that satisfies a predetermined condition from all of the files in the presentation packs storage folder 4 and transmits the presentation packs 2 to the data distribution server 3 in units of packages. The presentation package management processing unit 34 manages at least one package for each presentation package 2 and transmits a predetermined package depending on a request from the information display device 1. The download processing unit 15 returns at least one package received from the data distribution server 3 to restore the package information file 21, the automatic presentation script 23, the menu file 22, the presentation files 24-1 to 24-n, the material data 25-1 to 25-m, and the template files 26-1 to 26-k in the presentation package 2. In this manner, it is possible to deliver a plurality of programs to a single delivery designation without transmitting delivery designations for the respective programs, thus improving convenience.

The presentation packs are delivered in units of packages. Therefore, when a transfer error occurs, only a package in which the transfer error occurs is transmitted again, which shortens the delivery time can be shortened.

In addition, when updating the package information file 21 in the presentation package 2, the automatic presentation script 23, the menu file 22, the presentation files 24-1 to 24-n, the material data 25-1 to 25-m, and the template files 26-1 to 26-k, the package creating processing unit creates a package by using only an updated file as a target and delivers only the updated file. For this reason, it is possible to reduce an amount of data distributed when a program is added or changed.

The encoding processing unit 743 encodes a package and transmits the encoded package, and the data distribution server 3 stores the encoded package. Therefore, security can be improved.

In the example, encoding is performed in units of packages. However, encoding may be performed in units of files in a package. When encoding is performed in units of files and a package is delivered having only an updated file, the updating processing unit 342 and the delivery processing unit 343 of the data distribution server 3 decode the package and can either replace the updated file or create a package without encoding the package again. More specifically, the data distribution server 3 may manage only the encoded package. Therefore, security can be improved.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An information delivery display system comprising:
   an information creating device including a package creating processing unit that creates at least one package from at least one material data related to at least one program and at least one control information file in a presentation package;
   a data distribution server that receives the package created by the package creating processing unit from the information creating device, the data distribution server including a data storage unit that stores the received package, and a presentation package management processing unit that manages packages stored in the data storage unit in units of presentation packages; and
   an information display device that includes an information receiving unit that receives packages from the data distribution server, a download processing unit that decompresses at least one package received by the information receiving unit to restore the material data and the control information files in the presentation packages, and a display processing unit that reproduces and displays a program based on the material data and the control information files restored by the download processing unit; wherein
   the presentation package management processing unit further includes
   a package identification processing unit that identifies whether a package received from the information creating device is a package having only an updated file,
   an updating processing unit that replaces the updated file included in the package that has been determined by the package identification processing unit as a package having only an updated file with a file included in the package stored in the data storage unit, and
   a delivery processing unit that transmits all packages related to a requested presentation package to the information display device when a presentation package requested by the information display device is newly delivered and that creates a package having only an updated file and transmits the created package to the information display device when the requested presentation package has been delivered.

2. The information delivery display system according to claim 1, wherein the package creating processing unit creates a package based on at least one of a condition that:
   a file having a file size larger than a predetermined threshold value constitutes one package,
   files having the same extension representing the attribute of a file constitute one package, and
   files registered in the same sub-folder constitute one package.

3. The information delivery display system according to claim 1, wherein when the material data and the control information files in the presentation package are updated, the package creating processing unit creates a package based on the updated material data and control information files.

4. The information delivery display system according to claim 1, wherein the package creating processing unit encodes the created package, and the download processing unit decodes the received package.

5. An information delivery display method employed by an information delivery display system including an information creating device for creating a presentation package related to a program; and transmitting the created presentation package and an information display device for reproducing and displaying the program based on the presentation package received from the information creating device, the information delivery display method comprising:

creating at least one package from at least one material data related to at least one program and at least one control information file in the presentation package;
transmitting the created package to the information display device through a network; and
reproducing and displaying the program based on the material data and control information files in the received package; wherein
the transmitting further includes
identifying whether a package received from the information creating device is a package having only an updated file,
replacing the updated file included in the package that has been identified as a package having only an updated file with a file included in a package stored in a data storage unit,
transmitting all packages related to a requested presentation package to the information display device when a presentation package requested by the information display device is newly delivered, and
creating a package having only an updated file and transmitting the created package to the information display device when the requested presentation package has been delivered.

* * * * *